(12) United States Patent
Bosshart

(10) Patent No.: US 6,970,967 B2
(45) Date of Patent: Nov. 29, 2005

(54) CROSSBAR CIRCUIT HAVING A PLURALITY OF REPEATERS FORMING DIFFERENT REPEATER ARRANGEMENTS

(75) Inventor: Patrick Bosshart, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 515 days.

(21) Appl. No.: 10/174,123

(22) Filed: Jun. 18, 2002

(65) Prior Publication Data

US 2003/0233508 A1 Dec. 18, 2003

(51) Int. Cl.$^7$ ................................. G06F 13/00
(52) U.S. Cl. .................. 710/317; 710/316; 710/305; 710/2; 710/51
(58) Field of Search .................. 710/305–306, 710/311–317, 1–2, 36–38, 31–32; 709/248–252; 716/5, 13–17; 326/38–41, 101

(56) References Cited

U.S. PATENT DOCUMENTS 5,306,967 A * 4/1994 Dow ........................ 326/101
5,995,735 A * 11/1999 Le ............................ 716/13
6,137,167 A * 10/2000 Ahn et al. .................. 257/691
6,292,021 B1 * 9/2001 Furtek et al. ................ 326/41
6,463,574 B1 * 10/2002 Culetu et al. ................ 716/8

* cited by examiner

*Primary Examiner*—Paul R. Myers
*Assistant Examiner*—Raymond N Phan
(74) *Attorney, Agent, or Firm*—Alan K. Stewart; W. James Brady, III; Frederick J. Telecky, Jr.

(57) ABSTRACT

A crossbar circuit (30, 40, 50, 60, 70, 80, 90, 100) having programmable repeater structures adapted to allow configuration of the crossbar with inputs at multiple sides of the crossbar die. A plurality of repeaters (62) are arranged in different repeater structures such that the repeater arrangement can be connected to inputs at different locations as a function of the corresponding input as it is physically positioned around the periphery of the crossbar. A pseudo code is provided allowing the repeater structures to be custom configured to corresponding inputs as a function of the desired crossbar as it is designed to be utilized in a particular large integrated circuit, such as a VLSI chip.

15 Claims, 5 Drawing Sheets

US 6,970,967 B2

CROSSBAR CIRCUIT HAVING A PLURALITY OF REPEATERS FORMING DIFFERENT REPEATER ARRANGEMENTS

FIELD OF THE INVENTION

The present invention is generally related to crossbar circuits, and more particularly to large crossbar circuits utilized in large integrated circuits such as VLSI chips.

BACKGROUND OF THE INVENTION

Crossbars are structures which can connect any input to any output. It is common in VLSI chips to implement large crossbars, such as shown at 10 in FIG. 1, to switch inputs coupled to one circuit block 12 to outputs feeding a second circuit block 14. For example, a crossbar may have 64 inputs and 64 outputs, where each of the inputs and outputs is 16 bits wide. The crossbar is built largely out of multiplexers, where each output is driven by a 16 bit wide, 64 input multiplexer. The 64 input mux is in practice implemented as a tree of smaller muxes. With 64 crossbar outputs, there are 64 instances of this 64-input, 16 bit wide mux.

Crossbars conventionally can be efficiently implemented as regular datapath structures, where each output mux is a bitstack, or a regular datapath component. The 64 output muxes are then placed in a sequence. For example, as shown at 16 in FIG. 2, the mux bitstacks are horizontal, with bit 0 on the left and bit 15 on the right. The datapath is then built up vertically, with output mux 0 on the bottom and output mux 63 on the top.

In this arrangement, each of the 64 16 bit input wires must be broadcast to all 64 output muxes. FIG. 3 shows these 1024 wires at 18 running vertically the entire height of the crossbar 10. It is typically the case that the load represented by the inputs of the 64 muxes is too large to be driven by a single wire, where the wire 18 is long enough that the resulting RC time constant is unacceptable. As a result, repeaters 20 must be inserted in the input wires 18, as shown in FIG. 4 for the case of an input wire divided into 4 segments by 3 repeaters.

It is often the case that the data input wires 18 are registered just as they come into the crossbar 10. The output data wires 18 may also be registered by registers 22, as shown in FIG. 5, giving a full clock cycle for the crossbar to function, and allowing time for the input and output signals on the wires 18 to travel potentially long distances. When the data inputs are registered, the repeaters 20 are driven from the buffered output of the registers.

The arrangement of FIG. 5 is a conventional case where all 1024 data input wires are input to the bottom of the crossbar module. It is also possible to input wires to the top of the module, as shown in FIG. 6, using repeaters to form a basic repeater structure as shown.

There is desired an improved crossbar adapted to have data inputs at multiple sides of the module periphery and an architecture which provides custom programming to achieve such a feature.

SUMMARY OF THE INVENTION

The present invention achieves technical advantages as a crossbar circuit having a plurality of repeaters forming different repeater arrangements, whereby inputs to the crossbar circuit are defined about a perimeter of the circuit, with each input coupled to one repeater arrangement and being configured as a function of the input location relative to the crossbar circuit on the die.

The repeater topology is dependent upon the physical location of the repeater structure in the crossbar, which location is a function of the input locations to be interconnected thereto. This advantageously allows a plurality of muxes to be driven by the repeaters, with the crossbar circuit outputs being provided by these muxes. Preferably, the muxes are petitioned into mux groups, wherein each mux group is driven by repeaters positioned proximate to the respective group. Each input preferably has the plurality of bits, wherein the repeater arrangement is provided for each bit.

The various repeater arrangements comprise serially connecting repeaters, and a data register associated with each repeater arrangement may feed the repeater arrangements at different sections thereof. For instance, one data register may feed the end of the repeater structure, while other data registers feed the midsection of the repeater arrangements, depending upon where the input to the respective data register is located relative to the die periphery.

The data register/repeater arrangements are adapted to be programmed by a pseudo code and executed by a layout compiler, such that inputs are selectively coupled to the repeater arrangements as a function of the relative position of the input at the crossbar periphery. Advantageously, the inputs can be selectively arranged about the perimeter of the crossbar die such that the crossbar can be custom configured to interface to other circuit blocks designed thereabout for a particular design.

DETAILED DESCRIPTION OF THE PREFERRED EMBODIMENT

Figure 1:
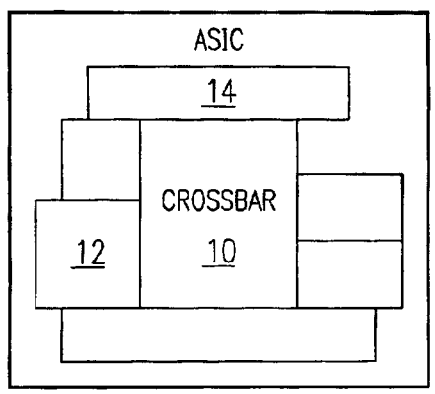
FIG. 1 is a block diagram of an ASIC circuit including a large crossbar interfacing various circuits blocks interfaced at different sides of the crossbar circuit.
Figure 2:
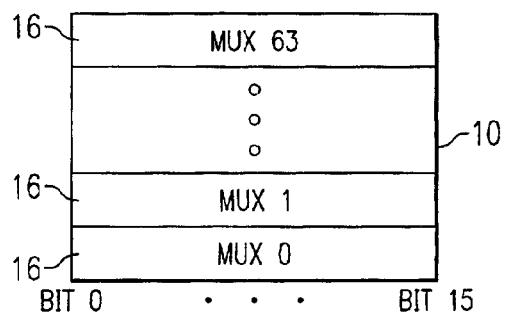
FIG. 2 is a block diagram of a crossbar circuit with mux bit stacks arranged horizontally.
Figure 3:
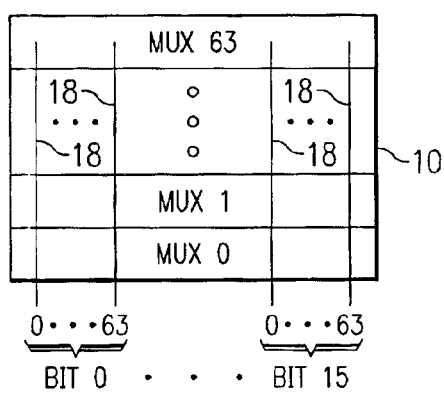
FIG. 3 is a block diagram of a crossbar illustrating the plurality of vertically oriented wires extending from corresponding inputs to each of the muxes.
Figure 4:
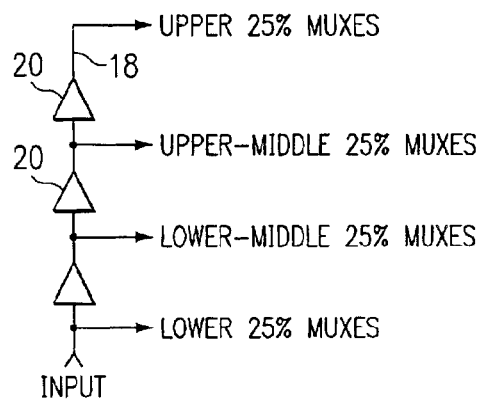
FIG. 4 is a block diagram of a repeater structure for one input adapted to feed different groups of muxes.
Figure 5:
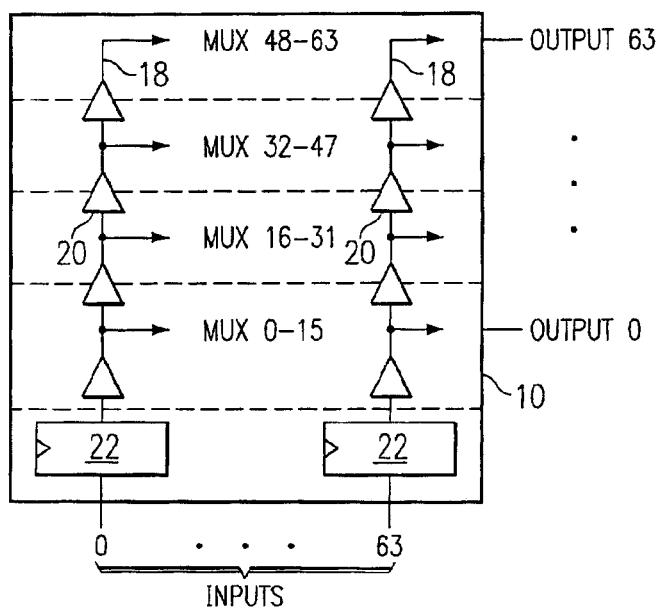
FIG. 5 is a block diagram of a crossbar having all inputs provided at the bottom of the crossbar module and feeding a respective data register and repeater arrangement.
Figure 6:
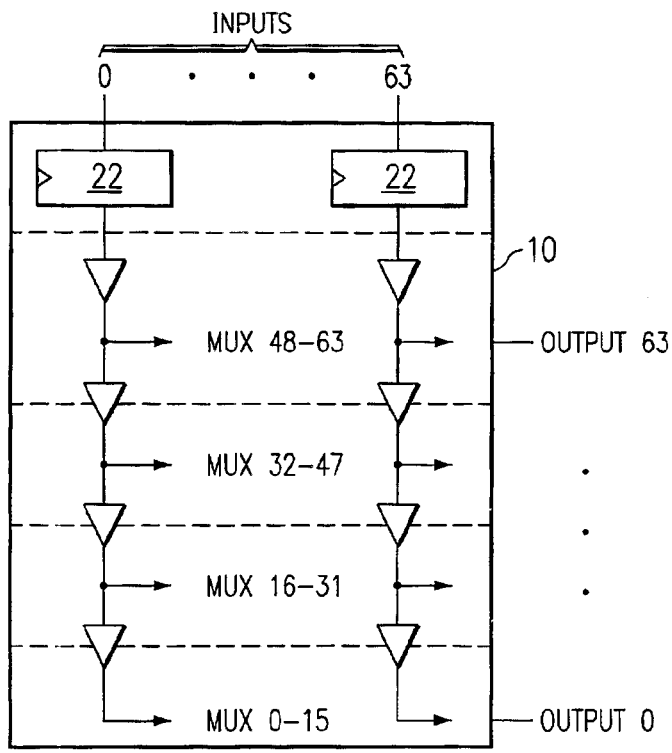
FIG. 6 is a block diagram of a crossbar with all inputs received at the top of the module.
Figure 7:
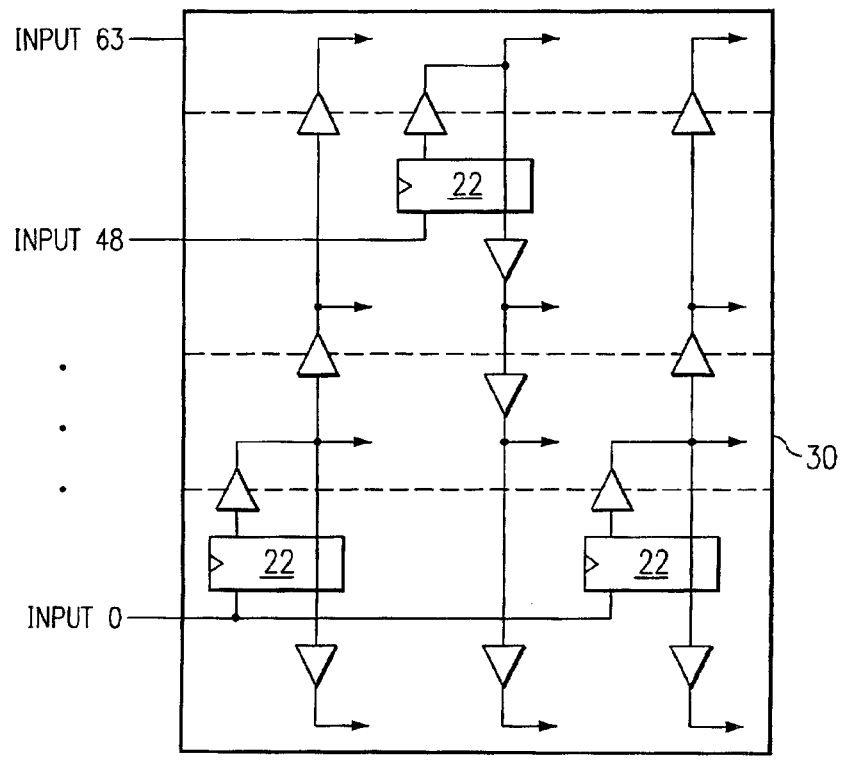
FIG. 7 is a block diagram of a crossbar having different topologies of repeater arrangements, the different topologies being a function of where the associated input is located about the periphery of the module.
Figure 8:
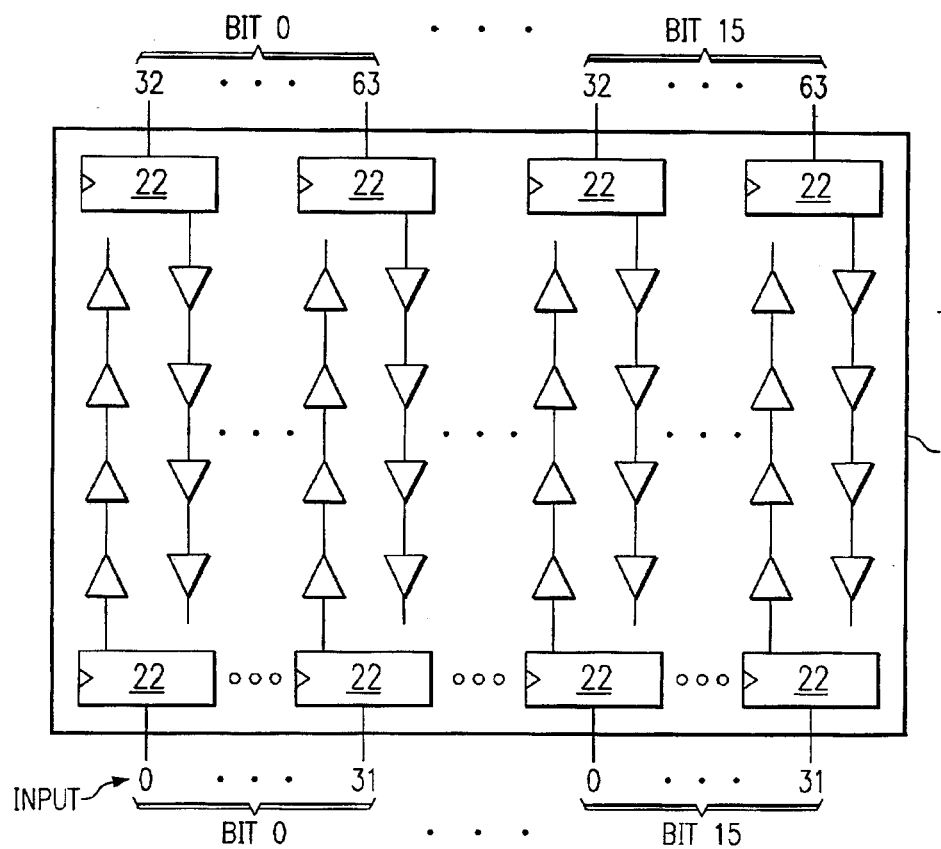
FIG. 8 is a block diagram of a crossbar module with inputs being provided at both the lower portion and the top portion of the crossbar module.

The present invention derives technical advantages as a crossbar accommodating inputs from many sides to interconnect large circuits defined about the periphery of the crossbar. Depending on where the data inputs come from, the arrangement of repeaters in the crossbar is different, as shown at 30 and 40 in FIGS. 7–8. For the example of a 64×64×16 bit crossbar, it is usually desirable to have the 1024 data input wires come from multiple sides of the crossbar module periphery. FIG. 8 shows a crossbar 40 having some inputs coming from the bottom and some from the top of the crossbar module. Note that on the bottom, inputs 0–31 arrive, with the 32 vertically extending wires for bit 0 on the left, and then 32 wires for each successive bit until finally the 32 input wires for bit 15 lie on the right. Likewise, for the top, where inputs 32–63 arrive, bit 0 is on the left and bit 15 is on the right with downwardly extending wires. Each of these wires includes repeaters 42 forming a repeater topology as a function of the input location as will now be discussed further.

Figure 9:
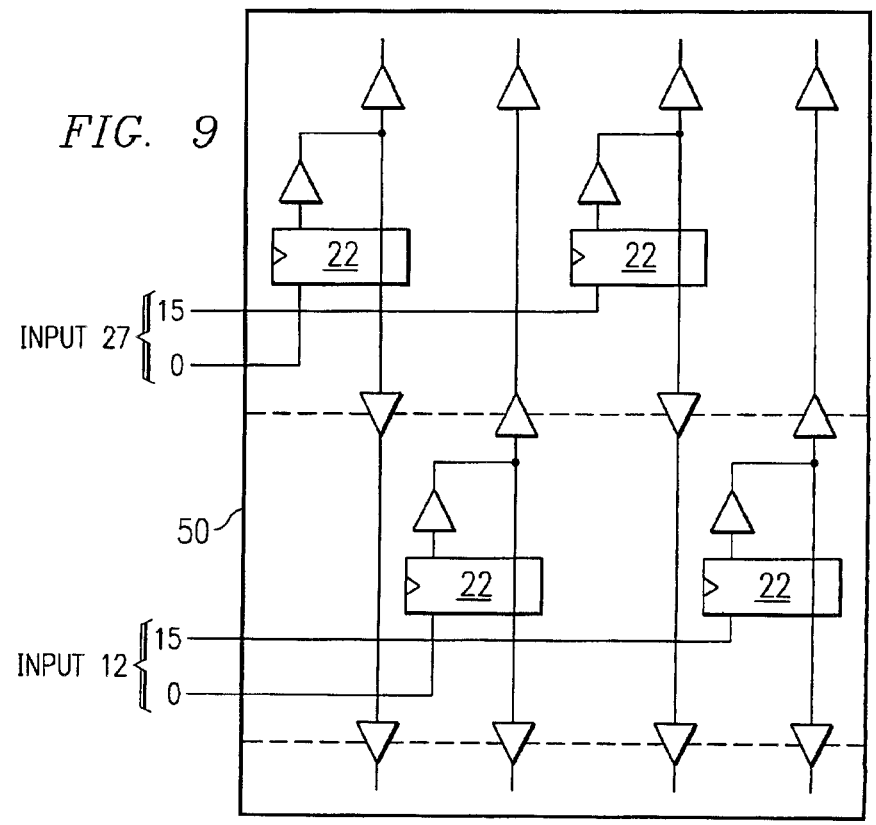
FIG. 9 is a crossbar depicting some of the inputs coming from the side of the crossbar and connected to different repeater arrangements being a function of the vertical location of the input.

FIG. 9 shows a crossbar arrangement at 50 where some inputs are defined at the left side of the crossbar. The 16 bits of input 12 arrive in sequence, following which are the 16 input bits of the next input. Further up the left side of the crossbar, the 16 bits of input 27 are shown arriving in sequence. The relative location of the input relative to the crossbar determines the associated repeater structure topology, as shown.

It is desired to be able to conveniently generate custom crossbars, and the desired port locations of the data input signals relative to the crossbar periphery must be accommodated, since each crossbar application requires inputs to come from distinctly different locations. Different input locations result in different repeater structures. An algorithm to produce and connect these repeater structures to inputs will now be described, as well as the resulting structures themselves, followed by examples in view of FIG. 10 and FIG. 11.

Compiler Algorithm

First, for a particular crossbar design, the number of segments the data input wires will be broken into is determined, identified as Nseg. There will be Nseg repeater buffers 62 driving each wire, where one of the wire segments is driven directly by a buffer off the data input register 22, and the other segments are driven from other respective repeaters 62. The output muxes are divided into Nseg groups, each mux being fed from a different repeater output of a data input wire. For the case of a crossbar with 64 inputs and Nseg=4, the input wire is broken into 4 segments, with 16 adjacent output muxes being fed from each repeater output.

In this algorithm, the signal naming of the 4 repeated versions of a data input signal is as follows:

dinbuf[inpsig][repeat]<bit> where "inpsig" ranges from 0 to 63 for the 64 data inputs, "repeat" ranges from 0 to 3 for the 4 segments of the buffered data input wire, and "bit" ranges from 0 to 15.

The index repeat corresponds to the physical location of the data input wire segment, from 0 on the bottom to 3 on the top. Namely:

The bottom 16 output muxes 0 to 15 are fed from the wires:

dinbuf[inpsig][0]<bit>, the next adjacent 16 output muxes 16–31 are fed from the wires:

dinbuf[inpsig][1]<bit>, the next adjacent 16 output muxes 32–47 are fed from the wires:

dinbuf[inpsig][2]<bit>, and the last adjacent 16 output muxes 48–63 are fed from the wires:

dinbuf[inpsig][3]<bit>.

This arrangement is independent of the positioning of the data input ports. However, according to the present invention, the topology of the repeaters is dependent on the physical location of the input ports. Let "input_segment" be a function which given the data input number, returns which segment the data input lies in. This function can be designed custom for each crossbar application to indicate desired port locations, allowing flexibility in design. In this example, inputs at the bottom of the crossbar return 0, inputs at the top of the crossbar return 3, and other inputs along the left or right sides of the crossbar return from 0 to 3, depending on which 25% of the crossbar height they fell upon.

The following pseudo code generates all 4 repeaters in the sequence:

```
for data_input from 0 to 63//loop over 64 16b data input
    wires
input_loc<=input_segment(data_input);//which segment
    the input falls into
    for bit from 0 to 15//loop over the 16 bits
    //this is the first input buffer,
    //located wherever the input is,
    //buffering the input data register
        dinbuf[data_input][input_loc]<bit><=buffer(din_q
            [data_input]<bit>);
        for buffer_num from 1 to 3//loop over the remaining 3
            repeaters
        input_is_above<=(input_loc>=buffer_num);
        inpsig<=if input_is_above then buffer_num else
            (buffer_num −1);
        outsig<=if input_is_above then (buffer_num −1) else
            buffer_num;
        //these are the next 3 repeater buffers, at the 25, 50 and
            75% locations.
        dinbuf[data_input][outsig]<bit><=buffer(dinbuf[data_
            input][inpsig]<bit>);
end;
end;
end;
```

Expanding the cases:

inp@0 0->1->2->3
inp@1 0<-1->2->3
inp@2 0<-1<-2->3
inp@3 0<-1<-2<-3

Each arrow in the line represents one repeater out of the final 3 repeaters in the sequence, located at the 25%, 50% and 75% portions along the vertical extent of the crossbar module. If the input is below repeater 1 at the 25% point, repeater 1 takes dinbuf[inpsig][0] and produces dinbuf

[inpsig][1], i.e., 0->1. If the input is above repeater 1 at the 25% point, repeater 1 takes dinbuf[inpsig][1] and produces dinbuf[inpsig][0], i.e., 1->0.

Notice that the first buffer, driven from the registered data input, has a repeat index corresponding to its physical location, so for an input arriving in segment 2, the buffers would produce signals:
dinbuf[data_input][2]<bit>.

EXAMPLES

Figure 10:
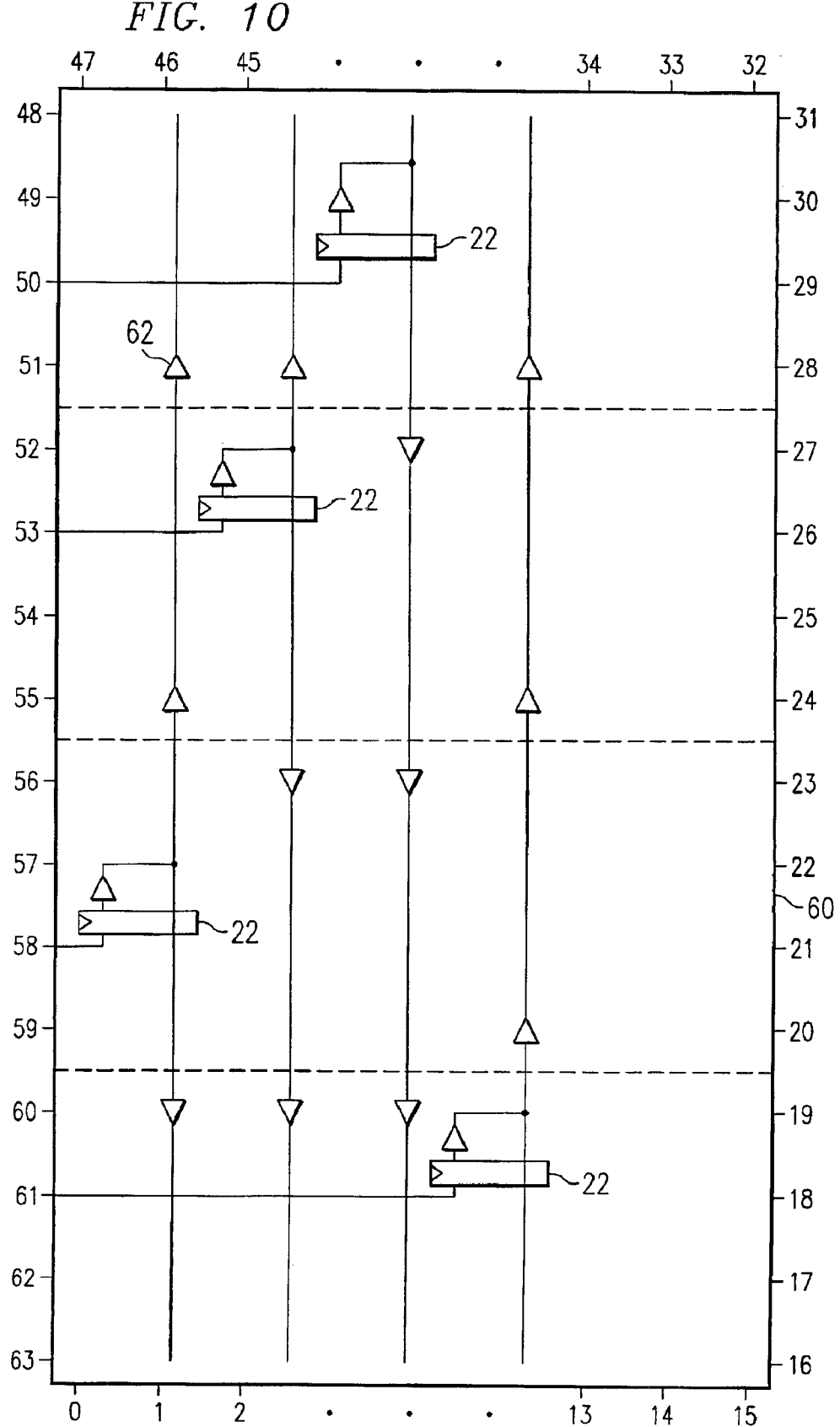
FIG. 10 is an illustration of a crossbar having inputs defined at all four sides of the crossbar module, depicting some of the inputs along one side feeding the respective repeater arrangement.
Figure 11:
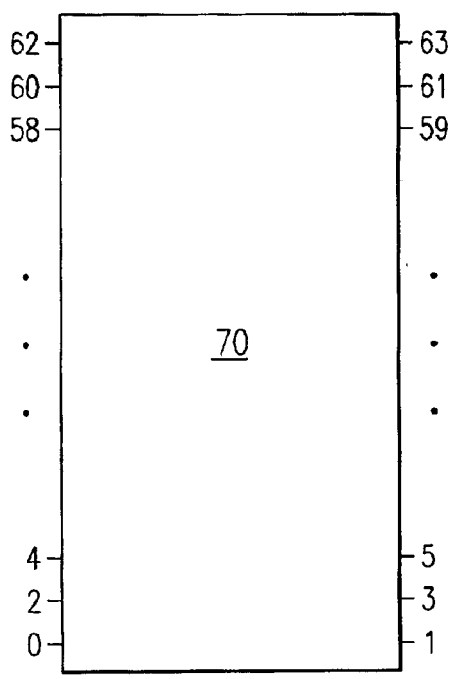
FIG. 11 depicts a crossbar with inputs alternating between the left side and the right side of the crossbar module.

As a first example shown in FIG. 10, a crossbar 60 will be discussed which has 64 inputs and 64 outputs, each 16 bits wide. The 64 inputs are distributed to all 4 sides of the crossbar module periphery, with 16 inputs per side. Inputs 0–15 come from the bottom, inputs 16–31 come from the right side, inputs 32–47 come from the top and inputs 48–63 come from the left side.

For bottom inputs 0–15, the 16 bit 0 inputs are on the left, followed by the 16 bit 1 inputs, until finally the 16 bit 15 inputs are on the right. The same is true of the top inputs 32–47.

For right side inputs 16–31, all 16 bits of each input are consecutively arranged, with all bits of input 16 starting at the bottom of the right side, followed by all bits of input 17, progressing until finally all bits of inputs 31 are at the top of the right side. The left side inputs 48–63 are similarly arranged, with input 63 at the bottom of the left side and input 48 at the top of the left side.

In this example, each of the vertical data input wires are separated into 4 segments, each separated from the next by a repeater 62. In order to customize the crossbar compiler to this floorplan, it is merely necessary to produce a function input_segment, which for each data input, returns which input segment the data falls into. The following piece of pseudo code provides the desired function:

```
function input_segment(input_num)
{
if (0 <=input_num <= 15) 0
elseif (16 <= input_Num <= 31) (logand 3 (input_num >> 2))
//bits <3:2>
elseif (32 <= input_num <= 47) 3
else                          (logand 3 (logxor 3 (input_num >> 2)))
endif;
}
```

Inputs 0–15 on the bottom belong to segment 0, while inputs 32–47 on the top belong to segment 3. Inputs 16–31 on the right side are distributed among the four segments, with four consecutive inputs to each segment. Thus:
inputs 16–19 belong to segment 0
inputs 20–23 belong to segment 1
inputs 24–27 belong to segment 2
inputs 28–31 belong to segment 3.
Inputs 48–63 on the left are distributed among the four segments, with four consecutive inputs to each segment. Thus,
inputs 48–51 belong to segment 3
inputs 52–55 belong to segment 2
inputs 56–59 belong to segment 1
inputs 60–63 belong to segment 0.

As a second example, a crossbar 70 is shown in FIG. 11, again with 64 inputs and 64 outputs, each 16 bits wide. The data input wires are again separated into 4 segments. This time, the data inputs will all come from the left and right sides of the crossbar, alternating sides, starting from the bottom.

In this case, the function input_segment is simpler, because the mapping is simple;
inputs 0–15 belong to segment 0
inputs 16–31 belong to segment 1
inputs 32–47 belong to segment 2
inputs 48–63 belong to segment 3.

```
function input_segment(input_num)
{
(logand 3 (input_num >> 4))        //bits <5:4>
}
Bits <5:4> of the input _num determine the input section.
```

It should be noted that it doesn't matter whether inputs are on the left or right, so the fact that in the above example the inputs alternate from the left to right side is unimportant. Many different left-right patterns would have the same input_segment function.

Figure 12:
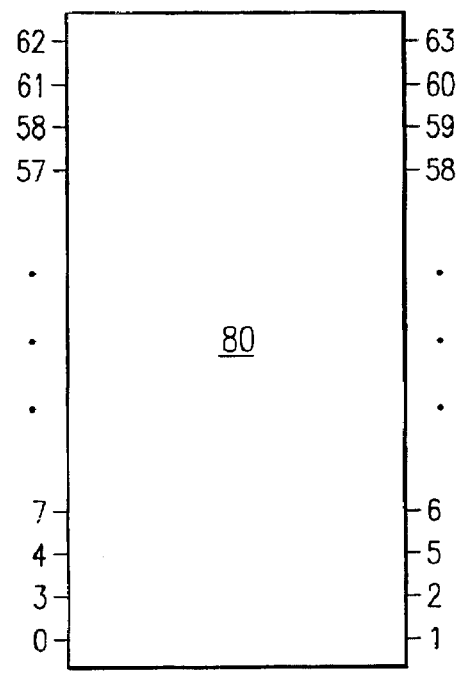
FIG. 12 illustrates a crossbar with inputs alternating from the left side to the right side in a serpentine pattern.

FIG. 12 shows a crossbar 80 with the inputs alternating from left to right in a serpentine pattern.

Figure 13:
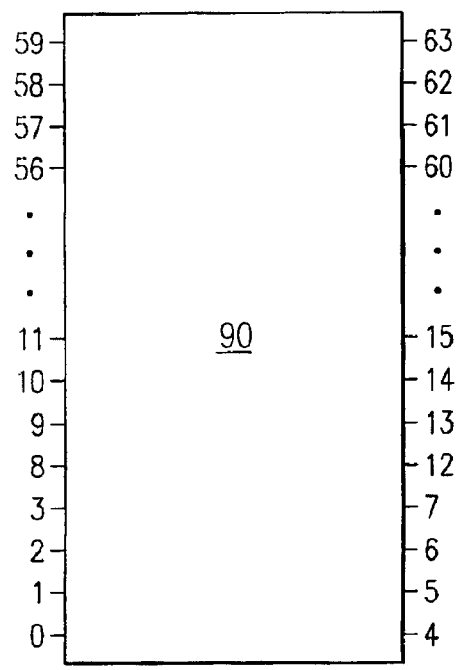
FIG. 13 depicts a crossbar with inputs alternating from the left side to the right side in groups of four.

FIG. 13 shows a crossbar 90 with the inputs alternating from left to right in groups of 4 signals; first 4 on the left, then 4 on the right, etc.

Figure 14:
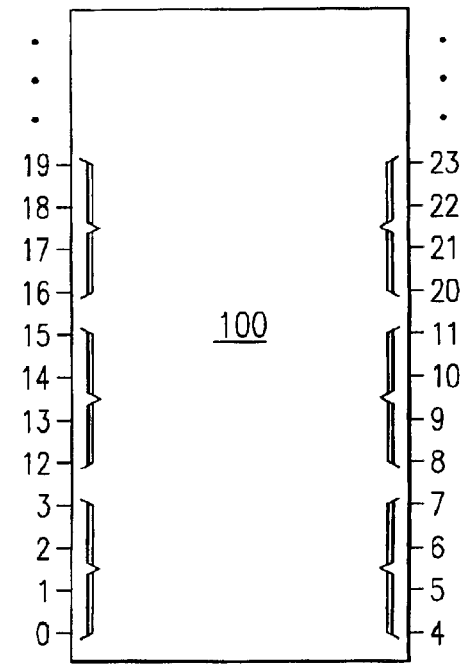
FIG. 14 depicts a crossbar with inputs serpentining from left to right in groups of four.

FIG. 14 shows a crossbar 100 with the inputs serpentining from left to right, in groups of 4 signals; where they are on the left, then right, right, left sides. All of these data input pin location patterns in FIGS. 12–14 share the same input_segment function above.

In summary, the algorithm for defining the crossbar configuration is as follows:

Let there be N output muxes.
Let there be Nseg segments in the data input wires, with repeaters between them, so that each wire drives N/Nseg output muxes.
Divide the output muxes into Nseg groups of physically adjacent muxes, numbered from 0 to Nseg-1.
Then, muxes in group K from 0 to Nseg-1 are driven by data input wire segment K.
Let input_segment be which one of the Nseg groups a data input wire port physically lies in.
Let the registered data input be called din_q.
Then, the first buffer takes din_q as its input and produces dinbuf[input_segment] as its output.
For the remaining Nseg-1 buffers, for buffer number M from 1 to Nseg-1, if input_segment>=M, then buffer M takes dinbuf[M] as its input and produces dinbuf[M-1] as its output.
For the remaining Nseg-1 buffers, for buffer number M from 1 to Nseg-1, if input_segment <M, then buffer M takes dinbuf[M-1] as its input and produces dinbuf[M] as its output.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:
1. A circuit, comprising;
   a crossbar;
   a plurality of repeaters forming a repeater arrangement, and forming different said repeater arrangements;
   a plurality of inputs, said inputs being defined about a perimeter of said crossbar, wherein each said input is coupled to one said repeater arrangement being con- figured as a function of said input location relative to said crossbar; and wherein some said repeater arrangements comprise serially connected said repeaters with said corresponding input feeding a midsection of said serially connected repeaters.

2. The crossbar circuit as specified in claim 1 wherein said repeaters are arranged in a topology that is dependent upon the physical location of the input on the crossbar.

3. The crossbar circuit as specified in claim 1 further comprising a plurality of muxes being driven by said repeaters, said crossbar circuit having outputs provided by said muxes.

4. The crossbar circuit as specified in claim 1 wherein said repeater arrangements are adapted to be programmed by a layout compiler pseudo code such that said inputs are selectively coupled to repeater arrangements.

5. The crossbar circuit as specified in claim 3 wherein the muxes are partitioned into groups, each said group being driven by said repeaters positioned proximate said group.

6. The crossbar circuit as specified in claim 3 wherein each said input has a plurality of bits.

7. The crossbar circuit as specified in claim 6 wherein one said repeater arrangement is provided for each said bit.

8. A circuit, comprising;

a crossbar;

a plurality of repeaters forming a repeater arrangement, and forming different said repeater arrangements;

a plurality of inputs, said inputs being defined about a perimeter of said crossbar, wherein each said input is coupled to one said repeater arrangement being configured as a function of said input location relative to said crossbar;

wherein said crossbar has multiple sides, wherein said inputs are configured at all said sides and selectively coupled to said repeater arrangements; and wherein said crossbar has laterally extending muxes, wherein some said inputs of opposing said crossbar sides are coupled to a midsection of said associated repeater arrangement at a node, such that said associated repeater arrangement is coupled to said muxes located above and below said node.

9. The crossbar circuit as specified in claim 8 wherein said inputs are arranged sequentially about a perimeter of said crossbar.

10. The crossbar circuit as specified in claim 8 wherein said inputs are arranged in a zig-zag pattern between two said crossbar sides.

11. The crossbar circuit as specified in claim 8 wherein said inputs are arranged in a serpentine arrangement between two said crossbar sides.

12. The crossbar circuit as specified in claim 8 wherein said inputs are arranged in a modulo x zigzag pattern between two said crossbar sides, where x is a number greater than 1.

13. The crossbar circuit as specified in claim 8 wherein said inputs are arranged in a modulo x serpentine pattern between two said crossbar sides, where x is a number greater than 1.

14. A circuit, comprising;

a crossbar;

a plurality of repeaters forming a repeater arrangement, and forming different said repeater arrangements;

a plurality of inputs, said inputs being defined about a perimeter of said crossbar, wherein each said input is coupled to one said repeater arrangement being configured as a function of said input location relative to said crossbar;

further comprising data registers coupled to the repeaters in a topology that is dependent upon the physical location of the data register on the crossbar; and wherein some said data registers feed a midsection of said repeater arrangements.

15. The crossbar circuit as specified in claim 14 wherein said cross bar circuit can be programmed in a plurality of configurations as a function of said inputs to be configured for use.

* * * * *